United States Patent
Lin et al.

(10) Patent No.: US 7,191,344 B2
(45) Date of Patent: Mar. 13, 2007

(54) METHOD AND SYSTEM FOR CONTROLLING ACCESS TO DATA STORED ON A DATA STORAGE DEVICE

(75) Inventors: Paul Lin, Fremont, CA (US); Henry Hon, Berkeley, CA (US)

(73) Assignee: Authenex, Inc., Oakland, CA (US)

( * ) Notice: Subject to any disclaimer, the term of this patent is extended or adjusted under 35 U.S.C. 154(b) by 802 days.

(21) Appl. No.: 10/215,981

(22) Filed: Aug. 8, 2002

(65) Prior Publication Data
US 2004/0030908 A1 Feb. 12, 2004

(51) Int. Cl.
*G06F 11/30* (2006.01)
*H04L 9/32* (2006.01)

(52) U.S. Cl. ............ 713/193; 713/165; 713/172; 713/189; 380/44; 380/262; 380/277; 380/281; 726/9

(58) Field of Classification Search ........ 713/165, 713/172, 189, 193; 380/44, 262, 277, 281; 726/9
See application file for complete search history.

(56) References Cited

U.S. PATENT DOCUMENTS

| | | | | |
|---|---|---|---|---|
| 4,856,062 A | * | 8/1989 | Weiss | 713/184 |
| 5,023,908 A | * | 6/1991 | Weiss | 713/184 |
| 5,241,599 A | * | 8/1993 | Bellovin et al. | 713/171 |
| 5,361,062 A | * | 11/1994 | Weiss et al. | 304/5.26 |
| 5,485,519 A | * | 1/1996 | Weiss | 713/185 |
| 5,887,065 A | * | 3/1999 | Audebert | 713/172 |
| 6,075,860 A | * | 6/2000 | Ketcham | 713/159 |
| 6,351,813 B1 | * | 2/2002 | Mooney et al. | 713/185 |
| 6,985,583 B1 | * | 1/2006 | Brainard et al. | 380/44 |

* cited by examiner

*Primary Examiner*—Kim Vu
*Assistant Examiner*—Beemnet W Dada
(74) *Attorney, Agent, or Firm*—Jeffrey P. Aiello; GSS Law Group

(57) ABSTRACT

A system and method of data encryption and decryption for controlling access to a data storage device such as a hard disk drive or optical drive is provided. The invented method utilizes data encryption and decryption techniques, combined with a token device, to control access to data stored on the data storage device.

12 Claims, 3 Drawing Sheets

METHOD AND SYSTEM FOR CONTROLLING ACCESS TO DATA STORED ON A DATA STORAGE DEVICE

BACKGROUND OF THE INVENTION

1. Field of the Invention

The present invention relates generally to data encryption and decryption systems and methods and, more particularly, to a method and system for controlling access to a data storage device.

2. Background Information

As electronic data becomes increasingly important, in both the business world and in personal lives, the need to protect such data similarly increases. Electronic data is typically stored on a data storage device. Known data storage devices include hard disk drives, tape drives, and optical disk drives, and may be situated in a computer system. Known computer systems include personal computers, or desktop computers, as well as networked computers.

The importance of the data stored on storage devices cannot be over-emphasized. Business accounting records, personnel records, research information, images, and personal information are stored as data on storage devices, and each is important for obvious reasons.

Therefore, preventing unauthorized access to data is critical. Unauthorized access to data stored on the storage device, often results in tampering with the data. This data tampering may include deletion, corruption, or infection of the data with a computer virus, for example. Any of these may render the data inaccessible or unusable by an authorized user. Thus, the information that the electronic data represents is lost to the user.

Data encryption/decryption is a long established means of controlling access to data. Similarly, systems and methods of data encryption/decryption are common in the prior art. Methods of data encryption and decryption are commonly configured as computer programs and are stored on a computer's storage device. Data encryption/decryption programs may be invoked by a user of the computer or may be invoked during boot up of the computer.

U.S. patent application Ser. No. 09/562,385, to P. Lin, the first the named inventor of the subject application is incorporated herein, in its entirety, by reference. Disclosed therein is a method of authentication of a user by an exchange that includes an electronic serial number, a plurality of substring designations, and a calculated authentication string. A user and an authentication authority each possess an identification string associated with the electronic serial number. By applying one or more operations, some of which may be exchanged across a network and others of which may be associated with the electronic serial number, a different authentication string can be calculated each time authentication is requested, making the methods and devices practicing this invention resistant to efforts to compromise the authentication.

BRIEF SUMMARY OF THE INVENTION

The present invention provides a system and method of data encryption and decryption for controlling access to a data storage device such as a hard disk drive or optical drive. The invented method utilizes data encryption and decryption techniques, combined with a token device, to control access to the data storage device. The invented method filters the flow of data between the storage device and a memory. Further, the method utilizes a symmetrical key for decrypting data, as the data is transmitted from the storage device to the memory, and for encrypting data, as the data is transmitted from memory to the storage device.

Preferably, the method of the present invention is installed in a computer system and stored on a data storage device, such as a hard disk drive or optical disk drive, of the computer system. The computer system may comprise a known "stand-alone" computer, such as a known personal computer or desktop computer, or may comprise a plurality of networked computers.

A unique token device is detachably coupled to a data port of the computer. The token device may include a processor running a data encryption/decryption program and a memory device for storing user data. Each token device is also provided with a unique string of information. This unique string of information, in combination with the encryption/decryption program running on the token's processor, enables the token to generate data that is unique to that token device. A copy of the unique string of information may reside at a remote location. The copy of the unique string of information is provided to enable boot up of the computer, if the token is lost or misplaced.

During installation of the invented method, a first 16-byte dynamic seed or puzzle $S_R$ is generated and stored in the token's memory. The first puzzle $S_R$ allows recovery of data stored on the storage device. The token's processor also uses $S_R$ to generate a Clear File Key (CFK). The CFK is a non-encrypted, symmetric file key that is used to encrypt and decrypt data stored on the computer's storage device, to allow access to the data by the user.

The CFK is transmitted to the computer's memory and remains there until the computer is powered down. While residing in memory, CFK is used to decrypt data, as the data is transmitted from the storage device to the memory, and to encrypt data, as the data is transmitted from memory to the storage device. Thus, the CFK, along with the data encryption/decryption program running on the computer's processor, filters the flow of data between the storage device and the computer's memory to prevent access to data on the storage device, since the data is in encrypted form.

Next, the token's processor outputs a first dynamic key $K_n$, based on the value of a subsequent dynamic puzzle $S_n$. The first dynamic key $K_n$ can function as a one-time password, since a new dynamic key $K_n$ is generated for each dynamic puzzle $S_n$. For example, if the user loses or misplaces their token, the subsequent dynamic puzzle $S_n$ can be transmitted to an administrator that possess the copy of the unique string of information. The administrator may reside at a remote location and may be accessed via conventional methods, such as the Internet, a company's intranet, or other known methods. Upon receiving the subsequent dynamic puzzle $S_n$, the administrator can generate $K_n$, and forward $K_n$ to the user.

CFK is fed into the computer's processor along with $K_n$. The computer's processor, which may be running an AES data encryption/decryption algorithm, generates a first Encrypted File Key ($EKF_n$), using CFK as the input and $K_n$ as the encryption key. $EKF_n$ is then stored on the computer's storage device along with $S_n$. The encrypted file key ($EKF_n$) hides the true CFK, to prevent access to encrypted data on the storage device.

In use, the invented method is initialized when a user couples their unique token device to the data port and boots up the computer. Upon booting the computer, the invented method first reads the subsequent dynamic puzzle $S_n$, then feeds $S_n$ into the token for processing. The token's processor again recognizes S, and outputs the first dynamic key $K_n$. $EKF_n$ is then decrypted, using $K_n$, to generate CFK.

Additionally, a next subsequent dynamic puzzle $S_{n+1}$ is generated for the next boot up of the computer and initialization of the method. Each time the invented method is invoked, a new puzzle $S_{n+1}$ is generated so that the puzzle, or seed, is dynamic. The next subsequent dynamic puzzle $S_{n+1}$ is simultaneously transmitted to the token and stored on the computer's storage device and overwrites the previously stored puzzle $S_n$.

Upon receiving the next subsequent dynamic puzzle $S_{n+1}$, the token's processor generates a subsequent dynamic key $K_{n+1}$. CFK is then encrypted using the subsequent dynamic key $K_{n+1}$ to generate a new subsequent Encrypted File Key ($EKF_{n+1}$). $EKF_{n+1}$ is then stored on the storage device. The encrypted file key, $EKF_{n+1}$ is the encrypted form of CFK and hides the true CFK, as previously discussed.

Upon initialization of the invented method, the computer will complete its boot up processes and the user operates the computer in a normal fashion. The user may remove the token from the computer's data port, upon the computer completing its boot up processes, if desired. The invented method has generated and saved the next subsequent dynamic puzzle $S_{n+1}$ and subsequent encrypted file key $EKF_{n+1}$, so the method is ready for the next boot up of the computer and initialization thereof.

When the user has finished using the computer, the computer is powered down and CFK is erased from memory. The user may then remove their unique token device from the data port, if they have not previously done so. If an attempt is made to access data stored on the storage device, the computer will not completely boot up without the token device, and access to the data on the storage device will be prevented, since the data is in encrypted form. Additionally, if a user couples a different token device to the computer's data port, that token device would not output the correct dynamic key $K_n$, since that token device has a different unique string of information. A different unique string of information results in an incorrect dynamic key $K_x$ being generated and the Encrypted File Key $EKF_n$ would not be decrypted.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED
EMBODIMENTS

The following description is provided to enable any person skilled in the art to make and use the invention and sets forth the best modes presently contemplated by the inventors of carrying out the invention. Various modifications, however, will remain readily apparent to those skilled in the art, since the generic principles of the present invention have been defined herein.

The present invention provides a method of data encryption and decryption for controlling access to a data storage device such as a hard disk drive or optical drive. The invented method utilizes data encryption and decryption techniques, combined with a token device, to control access to the data storage device. Further, the method utilizes a symmetrical key for decrypting data, as the data is transmitted from the storage device to the memory, and for encrypting data, as the data is transmitted from memory to the storage device.

Figure 1:
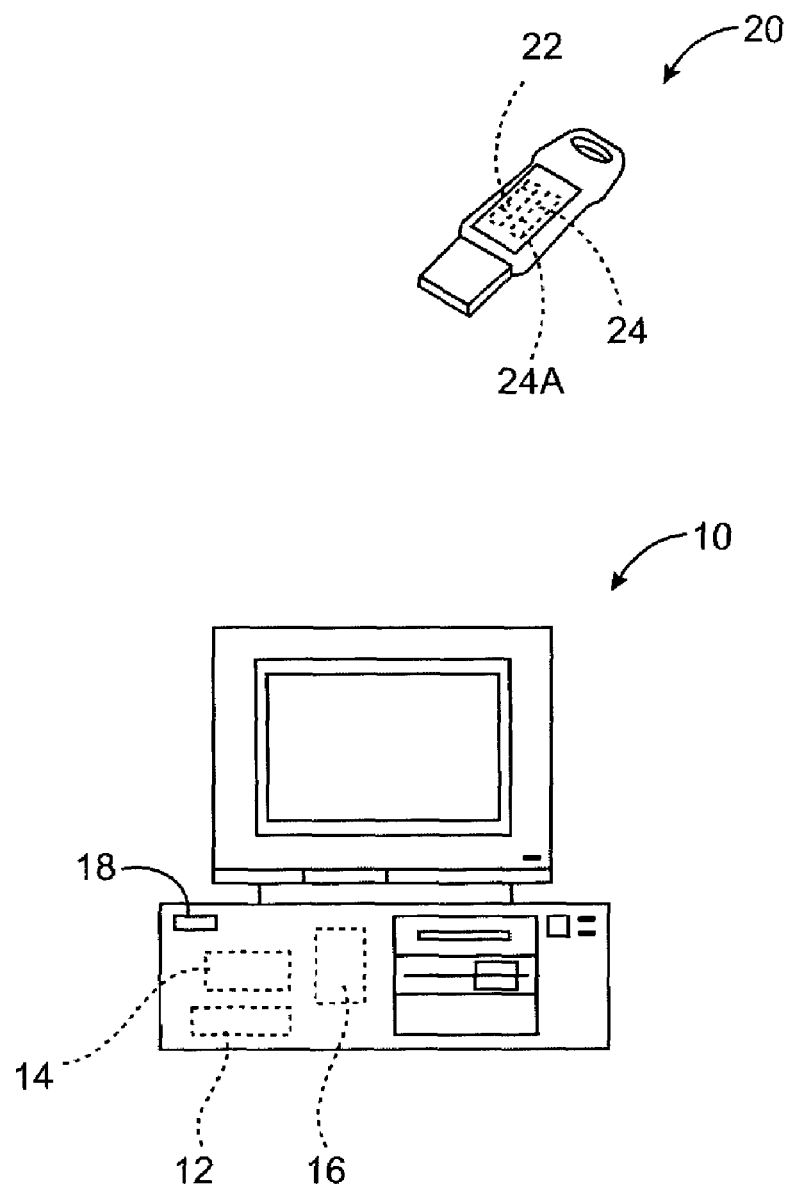
FIG. 1 is a schematic diagram of a computer system and a token device of a preferred embodiment of the method of the present invention.

Referring now to FIG. 1 of the drawings, a preferred embodiment of the method of the present invention is installed in a computer system 10 and stored on a data storage device 12 of the computer system 10. For example, the invented method may be provided in the form of a computer program and uploaded onto the computer system 10 and stored on the storage device 12, as is well known. The data storage device 12 may comprise any suitable known data storage device such as a hard disk drive or optical disk drive. For ease of reference only, the data storage device 12 will be referred to hereinafter as hard drive 12. The computer system 10, hereinafter computer, may comprise a known "stand-alone" computer, such as a personal computer or desktop computer, or may comprise a plurality of networked computers (not shown), for example. The computer 10 includes a processor 14 for processing data, a memory 16 for temporarily storing data, and a data port 18 to allow coupling of external devices to the computer 10. Preferably, the computer's processor 14 is capable of running a 128-bit data encryption/decryption program. Most preferably, the computer's process 14 is capable of running a 128-bit Advanced Encryption Standard (AES) technology data encryption/decryption program or a similar data encryption/decryption program.

A unique token device, shown schematically at 20, is configured to be detachably coupled to the computer 10 via its data port 18. The token 20 and data port 18 may be configured in any desired mutually compatible form factor which affords coupling and decoupling of the token 20 with the data port 18, and thus to the computer 10. For example, the data port 18 may comprise a known USB (Universal Serial Bus) port or similar data port.

The token 20 preferably includes an on-board processor 22 for processing data, a memory device 24 for storing data, and a coupling portion 26 for coupling the token 20 to the data port 18. The on-board processor 22 is preferably capable of processing 128-bit data. Additionally, the processor 22 is capable of running a data encryption/decryption program, such as an Advanced Encryption Standard (AES) technology data encryption/decryption program.

The token's memory device 24 includes a secure region 24A. The memory device 24 is configured to maintain data in the secure region 24A even when power to the token 20 is removed. Vital user data, such as a password for example, may be stored in the secure region 24A of the memory device 24 to prevent loss of the data.

Additionally, the token 20 is provided with a unique string of information. This unique string of information, in combination with the encryption/decryption program running on the token's processor 22, enables the token 20 to generate data that is unique to that token device. A copy of the unique string of information may be possessed an administrator (not shown) residing at a remote location. The copy of the unique string of information is provided to enable boot up of the computer 10, if the token 20 is lost or misplaced. The administrator may reside at a remote location and may be accessed via conventional methods, such as the Internet, a company's intranet, or other known methods.

Figure 2:
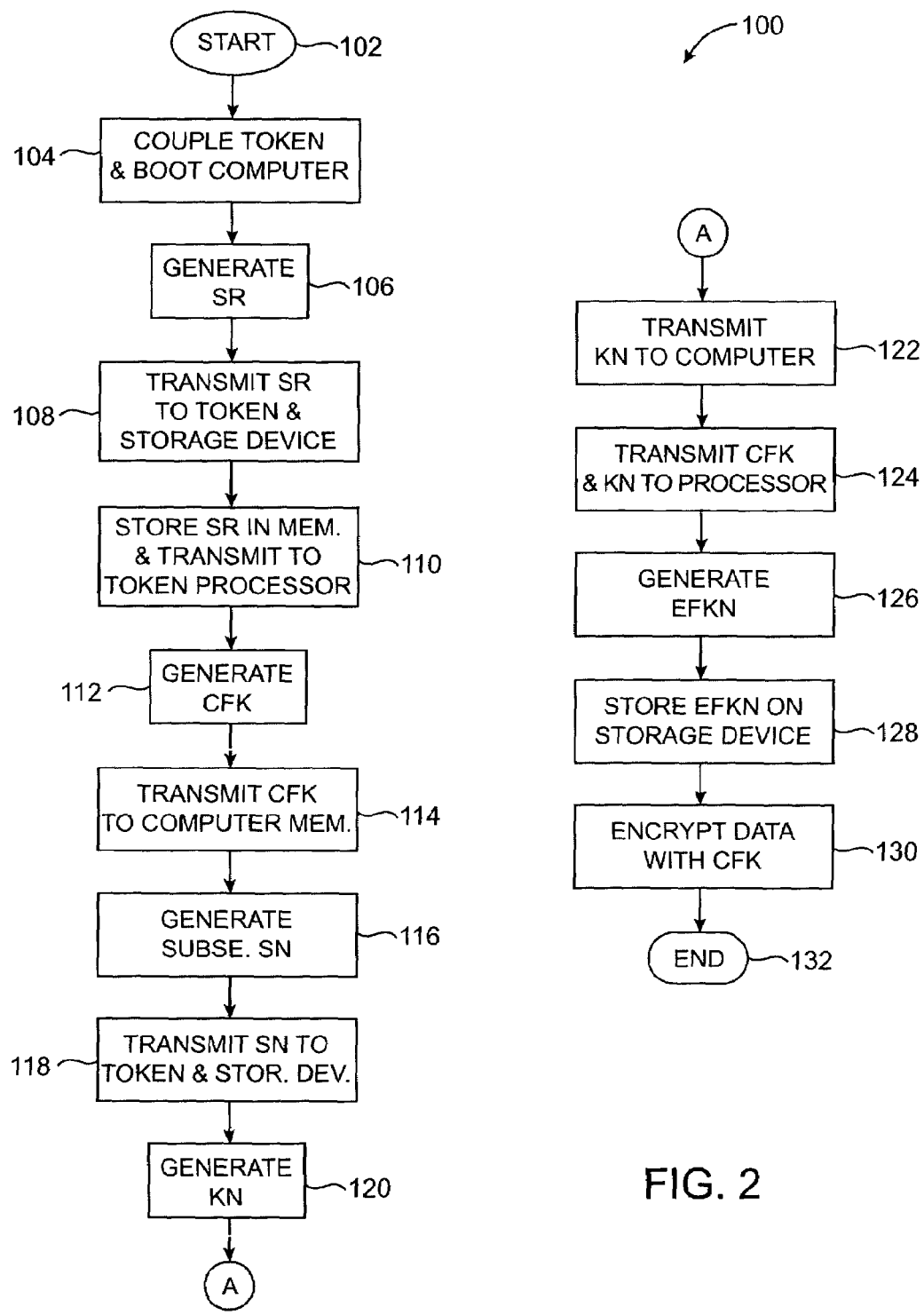
FIG. 2 is a flow chart showing an installation procedure of a preferred embodiment of the method of the present invention.

Referring now to FIG. 2 of the drawings, there is shown generally at 100, an installation procedure of a preferred embodiment of the invented method. The installation procedure 100 begins at start block 102. The installation procedure 100 of the preferred embodiment of the invented method is initialized in process block 104 where a user couples their token 20 to the computer's data port 18 and begins uploading the invented method on to the computer 10. For example, prior to installation the invented method may be stored on a known portable data storage device such as a compact disk or floppy disk, shown schematically at 26. The disk 26 is inserted in a disk drive 28 of the computer 10. The disk drive 28 reads the data, comprising the invented method, stored on the disk 26 and begins transmitting the data to the computer 10, as is well known.

In process block 106, the method generates a first dynamic seed or puzzle $S_R$. The first puzzle $S_R$ is simultaneously stored in the secure region 24A of the token's memory 24 and on the computer's hard drive 12 in process block 108. The first puzzle $S_R$ functions as a rescue puzzle to allow recovery of data stored on the computer's hard drive 12 (more thoroughly discussed hereinafter). The dynamic puzzle $S_R$ may be a randomly generated 16-byte number that may be generated by any one of several well known methods.

The invented method continues in process block 110 where, when the first puzzle $S_R$ is stored in the token's memory 24A, the puzzle $S_R$ is also fed into the token's processor 22. Using a data encryption/decryption program, such as an AES encryption program, running on its processor 22, the token 20 generates and outputs a Clear File Key (CFK) in process block 112. The Clear File Key (CFK) is based on the first puzzle $S_R$ received by the processor 22. The CFK is a non-encrypted, symmetric file key that is used to encrypt and decrypt data stored on the computer's hard drive 12, to allow access to the data by the user. In process block 114 CFK is transmitted to the computer's memory 16 and remains there until the computer 10 is powered down.

A subsequent dynamic puzzle $S_n$ is then generated in process block 116 by the installation procedure 100 of the invented method. In process block 118, the subsequent dynamic puzzle $S_n$ is simultaneously fed into the token's memory 24 and stored on the hard drive 12. In process block 120 the token's processor 22 recognizes the subsequent dynamic puzzle $S_n$ as a challenge. Using the AES program and the token's unique string of information, the processor 22 outputs a first dynamic key $K_n$, based on the value of the subsequent dynamic puzzle $S_n$.

The first dynamic key $K_n$ can function as a one-time password, since a new dynamic key $K_n$ is generated for each subsequent dynamic puzzle $S_n$. For example, if the user loses or misplaces their token, the subsequent dynamic puzzle $S_n$ can be transmitted to the administrator possessing the copy of the unique string of information. Upon receiving the subsequent dynamic puzzle $S_n$, the administrator can generate $K_n$, and forward $K_n$ to the user. The first dynamic key $K_n$ is then transmitted to the computer's memory 16 in process block 122.

In process block 124, CFK is fed into the computer's processor 14 along with $K_n$. The computer's processor 14, running an AES data encryption/decryption algorithm, generates a first Encrypted File Key ($EKF_n$), using CFK as the input and $K_n$ as the encryption key, in process block 126. $EKF_n$ is then stored on the hard drive 12 in process block 128. The encrypted file key ($EKF_n$) hides the true CFK, to prevent access to data on the hard drive 12. The data encryption/decryption program running on the computer's processor 14 then encrypts the data on the hard drive 12 using CFK in process block 130. Thus, the CFK, along with the encryption/decryption program running on the computer's processor 14, filters the flow of data between the hard drive 12 and the computer's memory 16 to prevent access to data on the hard drive 12, since the data is in encrypted form.

Data is encrypted with CFK to prevent access to the stored data. The installation procedure 100 of the invented method terminates in end block 132. Upon completion of installation of the invented method, a user may power down (turn off) the computer 10 or they may manipulate data stored on the hard drive 12 as they normally would. The user may remove the token 20 from the computer's data port 18, upon the computer 10 completing its boot up processes, if desired. If the computer 10 is powered down, the user removes their token 20 from the data port 18 to prevent unauthorized access to data stored on the hard disk drive 12, if they have not previously removed the token 20.

Figure 3:
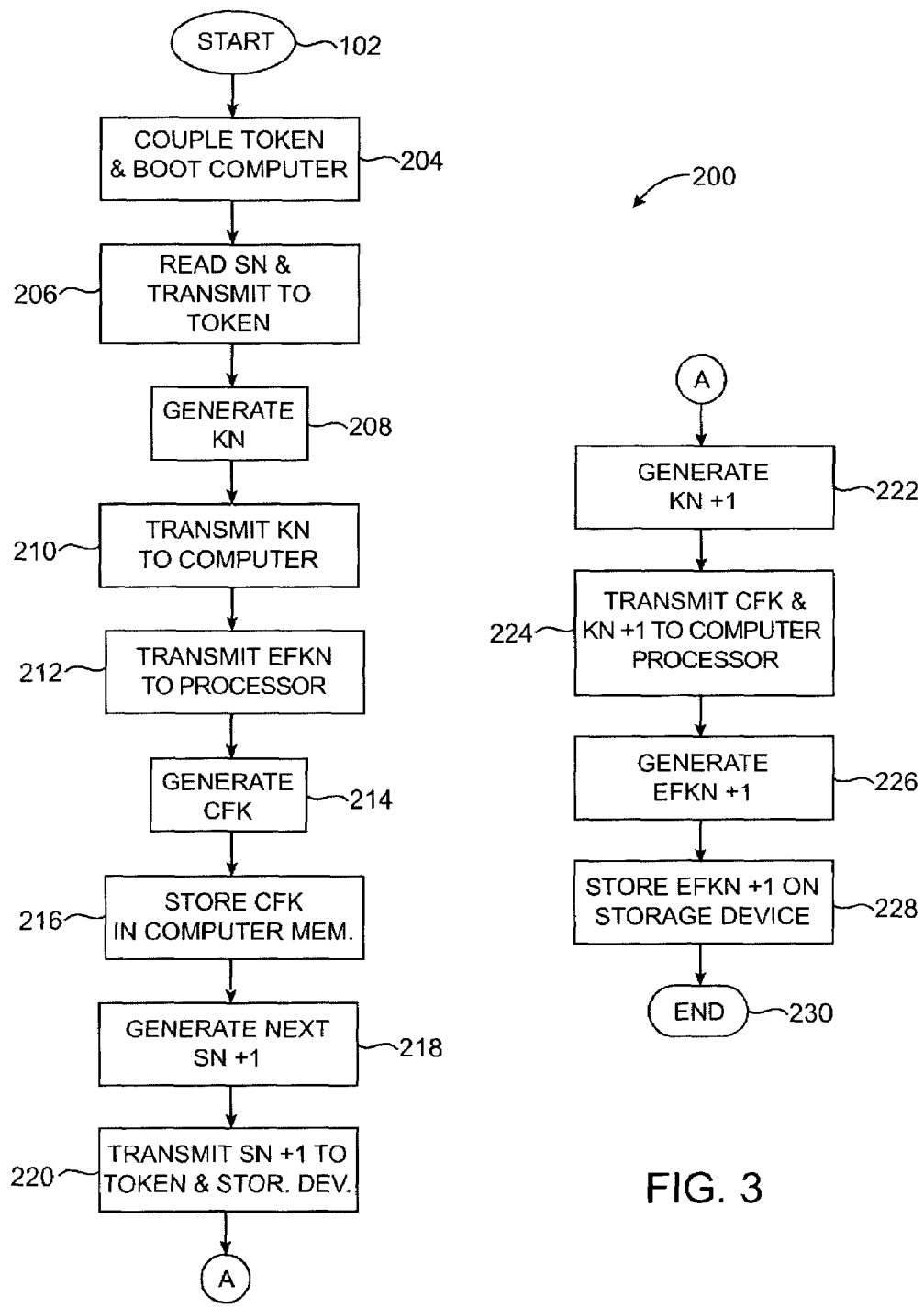
FIG. 3 is a flow chart showing an operating procedure of the method of the present invention.

Referring now to FIG. 3 of the drawings, there is shown generally at 200; an operating procedure of the invented method. The operating procedure 200 begins in start block 202. The operating procedure 200 is initialized when a user couples their unique token device 20 to the data port 18 and starts up, or boots up, the computer 10 in process block 204. Upon booting the computer 10, in process block 206, the operating procedure 200 of the invented method reads the subsequent dynamic puzzle $S_n$ that is stored on the hard drive 12 and transmits the dynamic puzzle $S_n$ to the token's processor 22 for processing. In process block 208, the token's processor 22 again recognizes the puzzle $S_n$ as a challenge, then using the AES encryption/decryption algorithm and the token's unique string of information, outputs the first dynamic key $K_n$. The first dynamic key $K_n$ is then fed transmitted to the computer 10 in process block 210.

In process block 212, $EKF_n$ is transmitted into the computer's processor 14 for decryption using $K_n$. Using the AES algorithm, the computer's processor 14 uses the first dynamic key $K_n$ to decrypt $EKF_n$ and generate CFK in process block 214. While the computer 10 is in use, the CFK remains in the computer's memory 16 to allow manipulation of data on the hard drive 12, as shown in process block 216. The CFK is transmitted to the computer's memory 16 and remains there until the computer 10 is powered down. The data encryption/decryption program running on the computer's processor 14 uses the CFK residing in memory 16 to decrypt data, as the data is transmitted from the hard drive 12 to the computer's memory 16, and to encrypt data, as the data is transmitted from memory 16 to the hard drive 12. Thus, the CFK, along with the data encryption/decryption program running on the computer's processor 14, filters the flow of data between the hard drive 12 and the computer's memory 16 to prevent access to data on the hard drive 12, since the data is in encrypted form.

In process block 218, the operating procedure 200 of the invented method automatically generates a next subsequent dynamic puzzle $S_{n+1}$ for the next boot up of the computer 10 and initialization of the operating procedure 200 of the invented method. After installation, each time the invented method is invoked, a new puzzle $S_{n+1}, S_{n+n}$, is generated so that the puzzle, or seed, is dynamic and cannot be readily duplicated. Once the new puzzle $S_{n+1}$ is generated, it is simultaneously transmitted to the token 20 and stored on the computer's hard drive 12 in process block 220. The new puzzle $S_{n+1}$, overwrites any puzzle $S_n$ previously stored on the hard drive 12.

In process block 222, upon receiving the next subsequent dynamic puzzle $S_{n+1}$, the token's processor 22 again recognizes the puzzle $S_{n+1}$ as a challenge, and uses the value of $S_{n+1}$ to generate a subsequent dynamic key $K_{n+1}$. In process block 224, CFK and the subsequent dynamic key $K_{n+1}$ are fed into the computer's processor 14, which is running the AES algorithm. The AES algorithm processes the two keys and outputs a new subsequent Encrypted File Key ($EKF_{n+1}$) in process block 226. $EKF_{n+1}$ is stored on the hard drive 12 in process block 228. The encrypted file key, $EKF_{n+1}$ is the encrypted form of CFK and prevents decryption CFK to prevent access to data stored on the hard drive 12, as previously discussed. The operating procedure 200 of the invented method then terminates in end block 230.

Upon completion of the operating procedure 200 of the invented method, the computer 10 will complete its boot up processes and the user can operate the computer 10 in a normal fashion. The user may then remove their unique token device 20 from the data port 18 if desired. The invented method has generated and saved the next subsequent dynamic puzzle $S_{n+1}$ and subsequent encrypted file key $EKF_{n+1}$, so the method is ready for the next subsequent boot up of the computer 10 and initialization thereof.

When the user has finished using the computer 10, the computer 10 is powered down. $EKF_{n+1}$ and $S_{n+1}$ are stored on the hard drive 12 and CFK is erased from the computer's memory 16. The user removes their unique token device 20 from the computer's data port 18, if they have not previously done so. Data stored on the computer's hard drive 12 is protected from unwanted access since the data is in encrypted form. If an attempt is made to access data stored on the hard drive 12, the computer 10 will not completely boot up without the token 20, and access to the data on the hard drive 12 will be prevented, since the data is encrypted.

Additionally, if a user couples a different token device to the computer's data port, that token device would not output the correct dynamic key $K_n$, since that token device has a different unique string of information. A different unique string of information results in an incorrect dynamic key $K_n$ being generated and the Encrypted File Key $EKF_n$ would not be decrypted.

While the computer 10 is in use, any one of a number of varied circumstances may arise that may cause the computer 10, or it's hard drive 12 to fail, commonly referred to as "crash". Such a failure may inhibit the user's access to $S_{n+1}$ and $EKF_{n+1}$, due to corruption of data stored on the hard drive 12. However, since the rescue puzzle $S_R$ is stored in the secure region 24A of the token's memory 24, and $S_R$ directly generates CFK, the user may access recoverable data stored on the hard drive 12.

Upon coupling the token 20 to the computer 10 and rebooting the computer 10, the token 20 outputs CFK, as previously discussed. The user then has access to data stored on the hard drive 12. The invented method is then reinstalled via the previously discussed installation procedure 100.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method (200) for allowing access to a storage device comprising:
    (a) accepting (204) a token device (20) that was plugged into a data port (18) of a computer (10) before booting up;
    (b) after booting up, transmitting (206) a puzzle (Sn) read from a hard disk storage device (12) on said computer (10) to the token device (20);
    (c) recognizing (208) puzzle (Sn) as a challenge, and using an encryption/decryption program to output a dynamic key (Kn) with a token processor (22) from said puzzle (Sn) in the token device (20);
    (d) transmitting (210) the dynamic key (Kn) through the data port (18) to a processor (14) of the computer system;
    (e) transmitting (212) an encrypted file key (EFKn) stored on the hard disk storage device (12) to the processor (14);
    (f) decrypting (214) the encrypted file key (EFKn) with the processor (14) using the dynamic key (Kn) to generate a clear file key (CFK);
    (g) storing (216) the clear file key (CFK) in memory (16) of the computer (10) until it is powered down;
    thereafter, using an encryption/decryption program running on the computer processor (14), and the clear file key (CFK) in memory (16), to routinely decrypt data as it is read from hard disk storage device (12) to computer memory (16), and to routinely encrypt data as it is written from computer memory (16) to the hard disk storage device (12);
    (h) for a next boot up of computer (10), automatically generating (218) a subsequent puzzle (Sn+1);
    (i) storing the subsequent puzzle (Sn+1) both on the hard disk storage device (12) and in the token device (20) so as to overwrite the previous puzzle (Sn);
    (j) generating (222) from the subsequent puzzle (Sn+1), a subsequent dynamic key (Kn+1) in the token device (20);
    (k) transmitting (224) the clear file key (CFK) and the subsequent dynamic key (Kn+1) to the processor (14) of the computer system;
    (l) encrypting (226) the clear file key (CFK) with the subsequent dynamic key to generate a subsequent encrypted file key (EKFn+1); and
    (m) storing (228) the subsequent encrypted file key (EKFn+1) on the hard disk storage device (12).

2. The method of claim 1, further comprising:
    generating a subsequent puzzle and a subsequent dynamic key are each subsequent activation of the computer system to generate a subsequent encrypted file key for preventing decryption of the clear file key and prevent unauthorized access of data stored on the storage device.

3. The method of claim 1, further comprising:
    storing a unique string of information on the token device; and
    sending a copy of the unique string of information to an administrator, so as to enable the recovery of encrypted data on the data storage device with a new generation of the dynamic key.

4. The method of claim 3, further comprising:
    if the token device later becomes unavailable, transmitting the puzzle to the administrator, the administrator selecting a unique string of information corresponding to the puzzle;

generating the dynamic key; and transmitting the dynamic key to the computer system to enable reading of encrypted data on the data storage device.

5. An installation method (100) for placing data access controls on a storage device in a computer system, comprising:

(a) accepting (104) a token device (20) plugged into a data port (18) of a computer (10);

(b) uploading a data storage access control program from either the token device (20) or a removable disk to the computer (10);

(c) generating (106) a first dynamic seed and rescue puzzle (Sr) that may thereafter be used to recover encrypted data stored on a data storage device (12) of the computer (10);

(d) storing (108) the first dynamic seed and rescue puzzle (Sr) both in a token memory (24A) of the token device (20) and a data storage device (12) of the computer (10);

(e) feeding (110) the first dynamic seed and rescue puzzle (Sr) to a token processor (22) in the token device (20);

(f) generating (112) with the token processor (22) and a data encryption/decryption program a clear file key (CFK) based on the first dynamic seed and rescue puzzle (Sr) received by token processor (22);

(g) transmitting (114) the clear file key (CFK) to the computer (10) and storing it in a memory (16) in the computer system (10) to stay there until it is powered down;

(h) generating (116) a subsequent dynamic puzzle (Sn);

(i) feeding (118) the subsequent dynamic puzzle (Sn) simultaneously to the token memory (24) and the data storage (12);

(j) recognizing (120) by the token processor (22) the subsequent dynamic puzzle (Sn) as a challenge, and using a unique string of information in the token device (20) and a data encryption/decryption program to produce a first dynamic key (Kn) that can function as a one-time password;

(k) transmitting (122) the first dynamic key (Kn) to the computer memory (16):

(l) feeding (124) both the clear file key (CFK) and the first dynamic key (Kn) to the computer processor (14);

(m) generating (126) a first encrypted file key (EKFn) using the clear file key (CFK) as an input and the first dynamic key (Kn) as an encryption key with computer processor (14) and a data encryption/decryption program;

(n) storing (128) the first encrypted file key (EKFn) on data storage device (12), wherein such an encrypted file key (EKFn) secrets a true clear file key (CFK); and (o) encrypting (130) data stored on the storage device with the clear file key (CFK) to prevent later unauthorized access of the data stored.

6. The method of claim 5 wherein the rescue puzzle is stored in a portion (24A) of the memory of token device able to maintain data when power is not supplied to the token device.

7. The method of claim 5 wherein if data stored on the data storage device becomes inaccessible then providing a method of regaining access to encrypted data stored on the data storage device comprising:

generating the rescue puzzle and storing the rescue puzzle in the memory of the token device;

generating the clear file key responsive to generation of the rescue puzzle;

transmitting the clear file key to the computer system and storing the clear file key in computer system's memory; and repeating the following steps to regain access to data stored on the storage device and to reinstall the method of controlling access to data stored on a storage device in a computer system:

encrypting the clear file key with the first dynamic key to generate a first encrypted file key;

storing the first encrypted file key on the storage device, the first encrypted file key preventing decryption of the clear file key to prevent access to data encrypted and decrypted by the clear file key; and allowing the computer system to complete a boot up process, whereby upon the computer system completing the boot up process access to data stored on the storage device is allowed and whereby when access to data stored on the storage device is no longer desired, the computer system is deactivated and the token device is removed from the computer system.

8. The method of claim 5, wherein the rescue puzzle is stored in a portion (24A) of the memory of the token device configured to maintain data when power is not supplied to the token device.

9. The method of claim 5, wherein a subsequent puzzle and a subsequent dynamic key are generated each subsequent activation of the computer system to generate a subsequent encrypted file key for preventing decryption of the clear file key to prevent access to data stored on the storage device.

10. The method of claim 5, wherein a unique string of information is stored on the token device and a copy of the unique string of information resides with an administrator, the unique string of information residing with the administrator enabling generation of the dynamic key.

11. The method of claim 5, wherein if the token device cannot be located, then further comprising:

transmitting the puzzle to the administrator, the administrator selecting a unique string of information corresponding to the puzzle;

generating the dynamic key; and transmitting the dynamic key to the computer system.

12. A computer data access system, comprising:

a plug-in token device (20) for a computer (10) on a data port (18), and providing for filtering of data flowing between the computer's main processor (14), RAM memory (16), and a data storage (12);

a token processor (22) disposed within the token device (20), and providing for the execution of a data encryption/decryption program;

a token memory (24) included in the token device (20) and including a non-volatile secure memory region (24A);

a unique string of information that, in combination with said data encryption/decryption program executing on the token processor (22), enables token (20) to generate data unique to a particular token device;

a copy of the unique string of information possessed by an administrator at a remote location and that enables a boot-up of computer (10) if token device (20) is unavailable;

a dynamic seed (Sr) disposed within the token memory (24) included in the token device, and for assisting in recovery of any encrypted data stored in said data storage;

a dynamic key (Kn);

a clear file key (CFK) comprising a non-encrypted, symmetric file key used to encrypt and decrypt data stored on said data storage so as to allow user access while maintaining encrypted data on said data storage;

a transmitted copy of the clear file key (CFK) that is sent to a RAM memory in said computer that exists there until said computer is powered down;

thereafter, using an encryption/decryption program running on the computer processor (14), and the clear file key (CFK) in memory (16), to routinely decrypt data as it is read from hard disk storage device (12) to computer memory (16), and to routinely encrypt data as it is written from computer memory (16) to the hard disk storage device (12); and a token processor information disposed within the token device and providing for execution of a data encryption/decryption process to generate unique data using the unique string of information.

* * * * *